United States Patent
Matusik et al.

(10) Patent No.: US 11,625,096 B2
(45) Date of Patent: Apr. 11, 2023

(54) WEARABLE GLOVE WITH HYBRID RESISTIVE-PRESSURE SENSORS

(71) Applicant: Massachusetts Institute of Technology, Cambridge, MA (US)

(72) Inventors: Wojciech Matusik, Lexington, MA (US); Daniela L. Rus, Weston, MA (US); Andrew Spielberg, Cambridge, MA (US); Josephine Anna Eleanor Hughes, Cambridge, MA (US); Gloria Chang, Houston, TX (US); Mark Chounlakone, Elgin, IL (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

(21) Appl. No.: 17/214,106

(22) Filed: Mar. 26, 2021

(65) Prior Publication Data

US 2021/0373663 A1    Dec. 2, 2021

Related U.S. Application Data

(60) Provisional application No. 63/030,513, filed on May 27, 2020.

(51) Int. Cl.
*G06F 3/01*      (2006.01)
*D03D 1/00*      (2006.01)

(52) U.S. Cl.
CPC .......... *G06F 3/014* (2013.01); *D03D 1/0088* (2013.01); *G06F 3/016* (2013.01); *D10B 2401/16* (2013.01); *D10B 2401/18* (2013.01)

(58) Field of Classification Search
CPC .......... G05B 2219/40553; G06F 3/016; G06F 3/04886; B60W 50/16; F15B 13/14; H01H 13/85
See application file for complete search history.

(56) References Cited

U.S. PATENT DOCUMENTS

| 6,589,171 B2 | 7/2003 | Keirsbilck |
| 8,605,049 B2 | 12/2013 | Spencer |

(Continued)

FOREIGN PATENT DOCUMENTS

WO    WO-2017120314 A1  *  7/2017  .......... A61B 17/135

OTHER PUBLICATIONS

Konishi et al., Fluid-Resistive Bending Sensor Compatible with a Flexible Pneumatic Balloon Actuator, Journal of Robotics and Mechatronics, vol. 20, No. 3, 2008, pp. 436-440, 5 pages.

(Continued)

*Primary Examiner* — William Lu
(74) *Attorney, Agent, or Firm* — Daly, Crowley, Mofford & Durkee, LLP

(57) ABSTRACT

A wearable article comprising a knitted fabric formed in the shape of a glove. A force sensing element coupled to the fabric, the force sensing element comprising a resistive sensing system and a fluidic sensing system comprising one or more soft tubes coupled to a surface of the wearable glove wherein the resistive and fluid sensing systems correspond to first and second different sensor modalities which are physically decoupled. Control circuitry is coupled to receive signals from both the resistive sensing system and the fluidic sensing system and to combine resistive and fluidic sensing system signals provided thereto to perform at least one of: pose estimation, environment sensing, human state sensing, and static and dynamic task identification.

22 Claims, 5 Drawing Sheets

(56) References Cited

U.S. PATENT DOCUMENTS

| | | | |
|---|---|---|---|
| 9,189,022 B2 | 11/2015 | Burgess | |
| 9,320,441 B1 | 4/2016 | Hays | |
| 10,649,528 B2 | 5/2020 | Hoen et al. | |
| 10,852,826 B1* | 12/2020 | Cox | G06F 3/016 |
| 11,048,344 B1* | 6/2021 | Drezet | H01F 7/20 |
| 2002/0178830 A1* | 12/2002 | Kazerooni | B65G 43/00 |
| | | | 73/760 |
| 2012/0025945 A1 | 2/2012 | Yazadi et al. | |
| 2015/0309563 A1* | 10/2015 | Connor | A61B 5/1071 |
| | | | 73/865.4 |
| 2018/0363173 A1* | 12/2018 | Keating | D03D 15/60 |
| 2019/0004602 A1* | 1/2019 | Holbery | G06F 1/163 |
| 2019/0346925 A1* | 11/2019 | Daniels | G06F 3/013 |
| 2020/0093679 A1* | 3/2020 | Sonar | G06F 3/014 |

OTHER PUBLICATIONS

Dunne et al., Initial development and testing of a novel foam-based pressure sensor for wearable sensing, Journal of NeuroEngineering and Rehabilitation, Mar. 1, 2005, pp. 1-7, 7 pages.

Giovanelli et al., Force Sensing Resistor and Evaluation of Technology for Wearable Body Pressure Sensing, Hindawi Publishing Corporation, Journal of Sensors, vol. 2016, Article ID 9391850, Jan. 17, 2016, pp. 1-14, 14 pages.

Ciotti et al., A Synergy-Based Optimally Designed Sensing Glove for Functional Grasp Recognition, Sensors Jun. 2, 2016, 17 pages.

Freire et al., OMG-VR: Open-source Mudra Gloves for Manipulating Molecular Simulations in VR, 2020, 4 pages.

Glauser, et al., Interactive Hand Pose Estimation using a Stretch-Sensing Soft Glove, ACM Trans. Graph., vol. 38, No. 4, Article 41. Publication dated Jul. 2019, 15 pages.

Shen et al., A soft stretchable bending sensor and data glove applications, Robotics and Biomimetics, 2016, 8 pages.

Gatka et al., "Inertial Motion Sensing Glove for Sign Language Gesture Acquisition and Recognition;" IEEE Sensor Journal, vol. 16, No. 16; Aug. 15, 2016; 7 Pages.

Giovanelli et al., "Force Sensing Resistorand Evaluation of Technology for Wearable Body Pressure Sensing;" Research Article in Journal of Sensors, vol. 2016; Accepted Jan. 17, 2016; 14 Pages.

Glowacki et al., "An Open Source Etextile VR Glove for Real-Time Manipulation of Molecular Simulations;" Article in Computer Science; Published Jan. 11, 2019; 4 Pages.

Kumar et al., "Hand Data Glove: A Wearable Real-Time Device for Human-Computer Internaction;" International Journal of Advanced Science and Technology, vol. 43; Jun. 2012; 12 Pages.

Lanaria, "Manus VR Gives HTC Vive Arm Tracking: Hands, Fingers, Elbows—You Name It;" Article in Tech Times; May 8, 2016; 3 Pages.

Lee et al., "Wearable Sensor Glove Based on Conducting Fabric Using Electrodermal Activity and Pulse-Wave Sensors for E-Health Application;" Report from Telemedicine and e-Health, vol. 16, Issue 2; 13 Pages.

Nguyen et al., "HandSense: Capacitive Coupling-Based Dynamic, Micro Finger Gesture Recognition;" Proceedings of the 17th ACM Conference on Embedded Networked Sensor Systems (SenSys 2019); Nov. 2019; 13 Pages.

Perng et al., "Acceleration Sensing Glove (ASG);" Conference Paper from Digest of Papers, Third International Symposium on Wearable Computers; Feb. 1999; 3 Pages.

Reid et al., "The Potential of Wearable Sensor Technology for EVA Glove Ergonomic Evaluation;" 2014 Southwest Regional Human Factors & Ergonomics Society Symposium; Jun. 6, 2014; 1 Page.

Sagisaka et al., "High-Density Conformable Tactile Sensing Glove;" 2011 11$^{th}$ IEEE-RAS International Conference on Humanoid Robots; Oct. 26, 2011; 6 Pages.

Sundaram et al., "Learning the Signatures of the Human Grasp Using a Scalable Tactile Glove;" Article in Nature Journal, vol. 569; May 30, 2019; 19 Pages.

Van Monsjou, "Meet Manus—the World's First Consumer Virtual Reality Glove;" Product by Manus VR; May 9, 2016; 4 Pages.

Vogt et al., "Design and Characterization of a Soft Multi-Axis Force Sensor Using Embedded Microfluidic Channels;" IEEE Sensors Journal, vol. 13, No. 10; Oct. 2013; 9 Pages.

Wang et al., "Flexible Sensing Electronics for Wearable/Attachable Health Monitoring;" Article from Small Journal; Mar. 17, 2017; 20 Pages.

Yan et al., "Thermally Drawn Advanced Functional Fibers: New Frontier of Flexible Electronics;" Research Article from Materials Today, vol. 35; May 2020; 27 Pages.

* cited by examiner

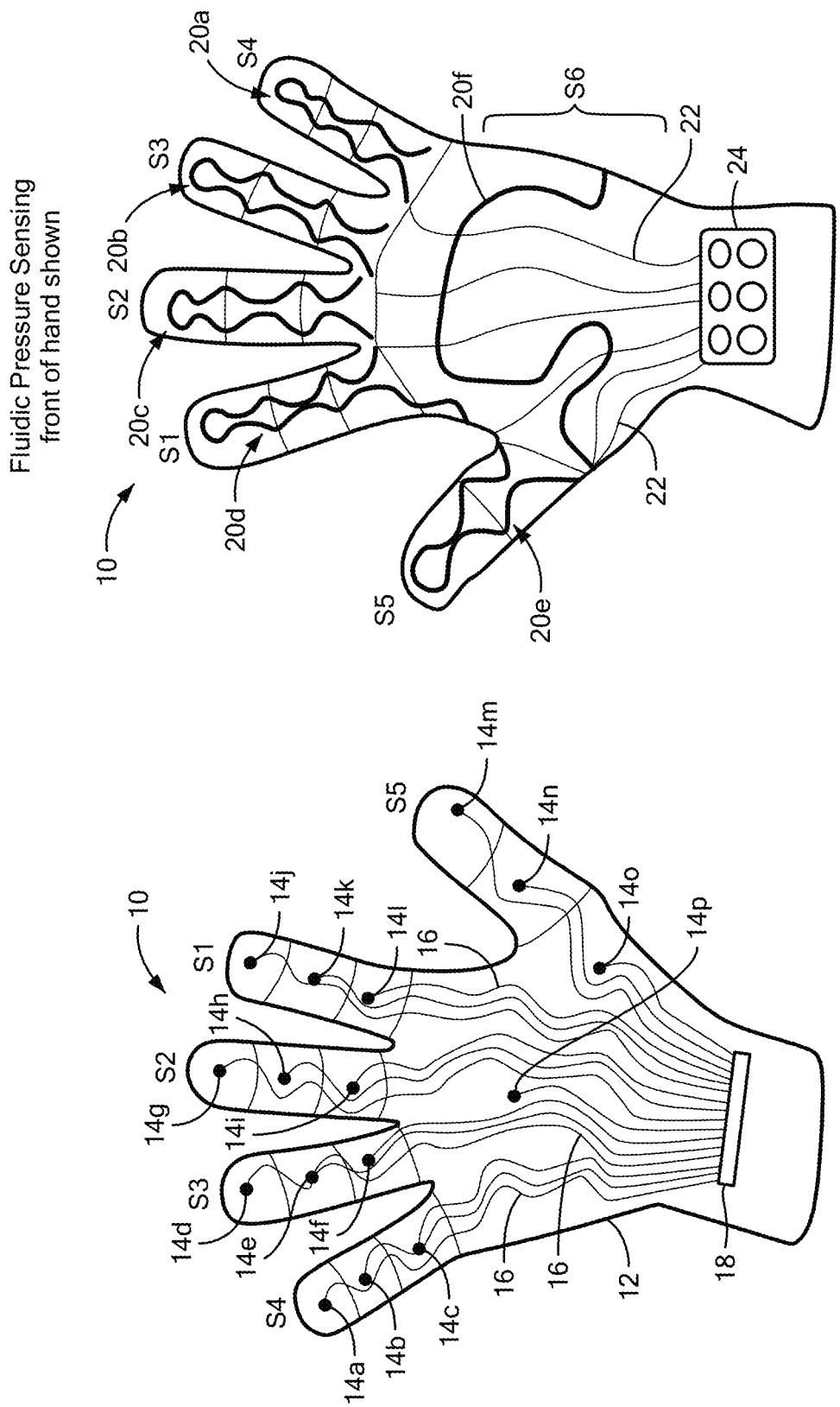

WEARABLE GLOVE WITH HYBRID RESISTIVE-PRESSURE SENSORS

CROSS REFERENCE TO RELATED APPLICATIONS

This application claims priority to and benefit if U.S. Provisional Application No. 63/030,513 (filed May 27, 2020), which is incorporated here by reference in its entirety.

GOVERNMENT RIGHTS

This invention was made with government support under EFMA1830901 awarded by the National Science Foundation (NSF). The government has certain rights in the invention.

BACKGROUND

Wearable devices have many applications ranging from health analytics to virtual and mixed reality interaction, to industrial training. For wearable devices to be practical, it is preferable that the devices be responsive, deformable to fit the wearer, and robust to the user's range of motion.

There have been several existing wearable glove and data capture systems which integrate sensing and inference in order to enable the identification of different stimuli. These sensing methods come in many forms.

Computer vision is one approach which provides an unobtrusive method of tracking hand motion. Early approaches from the 1990s used markers and neural networks to identify hand postures and locations. These technologies have evolved to enable tracking of colored gloves, or completely unmarked hands. The precision and reliability of such camera systems is high, enabling applications such as sign language identification and gestural interfaces for gaming. Despite the precision of these systems, they have a limited field of view and suffer from occlusion. They also cannot provide information about complex tactile interactions between human hands and objects, such as holding force or object temperature. Such limitations of vision-based systems motivate the adoption of in-hand wearable sensorization, which are not limited by field of view or occlusion and can sense more than pose.

Soft skins and soft electronics provide a means for achieving wearable sensors. Such technologies leverage several different sensing modalities including capacitive, resistive, knitted resistive sensors and stretchable electronics. Many wearable devices focus on providing tactile information or hand-pose information, advancing from previous work where the focus was on the detection of inertial forces or acceleration. However, many of these systems cannot decouple strain and normal force responses. In addition, the sensors are often challenging to fabricate, making it difficult to integrate multiple modalities of sensing.

Recent years have given rise to a number of high-performance gloves. Some glove systems use stretchable electronics to provide high resolution strain sensing to measure hand postures. With these systems, fabrication is challenging and there is no method for identifying applied forces. Gloves have been developed that merge capacitive sensing with neural-network-based inference to reconstruct hand pose with various degree error per joint angle.

A primary limitation of many prior art systems is the focus on using only a single sensing modality. By comparison, human skin has many different receptor types allowing inference of pressure, pose, temperature, and other environmental stimuli. Although some wearable glove systems have shown temperature monitoring or heart rate sensing, there is no one wearable system that begins to show the breadth of sensing capabilities that human skin possesses.

SUMMARY

In accordance with one aspect of the concepts, systems and techniques described herein, a wearable article comprises a knitted fabric formed in the shape of a glove, a force sensing element coupled to the fabric, the force sensing element comprising a resistive sensing system and a fluidic sensing system comprising one or more soft tubes coupled to a surface of the wearable glove wherein the resistive and fluid sensing systems correspond to first and second different sensor modalities which are physically decoupled and control circuitry attached to the knitted fabric and coupled to receive signals from both the resistive sensing system and the fluidic sensing system.

With this particular arrangement, a wearable glove capable of sensing characteristics of a surrounding environment is provided. By utilizing first and second different sensor modalities which are physically decoupled and control circuitry coupled to receive signals from both the different sensor modalities (e.g. resistive sensing system and the fluidic sensing system) and configured to combine resistive and fluidic sensing system signals, the wearable glove is capable of performing at least one of: pose estimation, environment sensing, human state sensing, and static and dynamic task identification.

In embodiments, the glove is formed from a conductive knit which is strain sensitive, providing information through a network of resistance measurements. Fluidic sensing captured via pressure changes in fibrous sewn-in flexible tubes, measuring interactions with the environment. In embodiments, the fabric of the glove is a conductive fabric. It may be a fabric that includes conductive fibers weaved into the fabric and/or it may be made of a wholly conductive material. Further, in embodiments, the described wearable glove is easy to fabricate using low cost, commercial off-the-shelf items in a manner that is amenable to automated manufacturing.

In embodiments, the wearable glove comprises a resistive knit architecture with interwoven pressure sensors. In embodiments, the wearable glove may be formed from a conductive knit which is strain sensitive, providing information through a network of resistance measurements. Fluidic sensing captured via pressure changes in fibrous sewn-in flexible tubes, measuring interactions with the environment. In combination with a learning system (e.g. a neural network or ML system), the wearable glove system described herein can reconstruct user hand pose and identify sensory inputs such as holding force, object temperature, conductibility, material stiffness, and user heart rate, all with high accuracy. The described wearable glove system has the ability to identify complex environmentally dependent tasks, including held object identification and handwriting recognition.

By including both resistive and fluidic sensing systems, the wearable glove described herein enables perception of a surrounding environment and is capable of robustly sensing temperature, pressure, and materials, enabling higher-level environmental reasoning and tactile skill. Thus, the wearable glove described herein is suitable for use in a wide variety of applications including, but not limited to, robotics interaction (e.g. soft robotics interaction), haptic devices, or other intelligent systems.

Utilizing dual-sensing modalities configured to decouple pressure and pose, allows a wide range of different sensory stimuli to be identified. The controller provides a means for combining the two sensing modalities to allow joint reasoning using signals provided by the dual-sensing modalities. In embodiments, the controller is configured to allow for combined pose and pressure-based reasoning thereby allowing for proprioception as well as high accuracy on a wide array of environment sensing tasks.

In accordance with a further aspect of the concepts, systems and techniques described herein, a system implementing a neural network or machine learning algorithm is coupled to a wearable glove.

With this arrangement, by marrying resistive and fluidic sensing technologies with machine learning neural architectures, a fully soft, wearable glove which provides signals which are informative enough to infer the precise physical state or activity of the user is provided. Furthermore, the soft, wearable glove described herein is capable of real-time hand pose reconstruction, environment sensing, and task classification.

In embodiments, the wearable glove comprises a knitted fabric, a resistive sensing system coupled to the fabric and a fluidic sensing system comprising one or more soft tubes coupled to a surface of the wearable glove.

In embodiments the resistive and fluid sensing systems correspond to first and second different sensor modalities which are physically decoupled and control circuitry attached to the knitted fabric and coupled to receive signals from both the resistive sensing system and the fluidic sensing system and configured to combine resistive and fluidic sensing system signals provided thereto to perform at least one of: pose estimation, environment sensing, human state sensing, and static and dynamic task identification.

In embodiments, the described wearable glove is easy to fabricate using low cost, commercial off-the-shelf items in a manner that is amenable to automated manufacturing.

The wearable glove described herein is capable of robustly sensing temperature, pressure, and materials, enabling higher-level environmental reasoning and tactile skill. The wearable glove described herein is thus suitable for use in a wide variety of applications including, but not limited to soft robotics, interaction and haptic devices, or other intelligent systems. By combining a neural network or other learning system with a wearable knit glove comprising both a resistive and fluidic sensing system, an article which is easy to manufacture and allows meaningful reasoning from tactile input is provided. Of particular interest, especially for biomimetic applications, are wearable sensorized gloves that approach the sensing capabilities of a human hand and the reasoning capabilities of the human brain.

A wearable glove comprising both a resistive and fluidic sensing system may be used in a glove system which ideally has the ability to mimic or even surpass human perception, could replace or augment human touch, and/or enable computers and robots to understand humans' interactions with the world.

Wearable gloves of the type described herein could thus allow those with sensory loss to 'feel' or 'see' the world again by providing them with a glove that can sense for them. Thus, wearable gloves of the type described herein could thus be used to monitor rehabilitation efforts and rates by providing feedback as to grip strength, an indicator of stroke recovery, or monitor tremors or muscle activity, potential health indicators. In addition, there are many further applications in industrial manufacturing, soft robotic sensing, and mixed reality interfaces.

A wearable glove may be provided by merging a dual-modality sensing architecture with computational learning models. It may be capable of advanced sensing tasks amenable to real-world interaction, including proprioception (i.e. inference of the wearer's hand pose), temperature sensing, conductive sensing, stiffness and force sensing, object classification, heart-rate monitoring, and even inference of dynamic tasks, all with highly robust accuracy and real-time performance.

Utilizing dual-sensing modalities configured to decouple pressure and pose, allows a wide range of different sensory stimuli to be identified. A controller circuit coupled to the glove may provide means for combining the two sensing modalities to allow joint reasoning using signals provided by the dual-sensing modalities. In embodiments, the controller is configured to allow for combined pose and pressure-based reasoning thereby allowing for proprioception as well as high accuracy on a wide array of environment sensing tasks.

The wearable glove described here include sensors which are robust to the types of activity common in the human hand including but not limited to a wide range of motion and complex environmental interactions, while providing high sensitivity and repeatability in the sensors.

The wearable glove is capable of capturing both kinematics (pose) and contact information independently. Thus, by combining a sensorized glove with a learning system, a glove which allows human-type interactions with the environment, is provided.

In embodiments, the glove may be provided from a soft, material knitted into a glove shape having sewn fibers and interwoven tubes, with no in-hand electronics and thus is relatively simple and inexpensive to manufacture. Thus, the soft, knitted wearable glove is practical for wide-scale deployment.

In accordance with a still further aspect of the concepts described herein, a wearable glove system having both resistive sensing and fluidic sensing systems combine to provide signals for strain and contact force information, respectively. These signals are fed into a neural network which is trained from captured data labeled with ground-truth knowledge. In other words, the neural network may be trained with data reference data captured from the glove, paired with an expected output such as a state of the glove corresponding to the captured data. Depending on the neural network used, the output of the network provides inference for a wide variety of downstream tasks.

To achieve some or all of the benefits listed above, a wearable article (e.g. a glove) comprises, a fabric, control circuitry, a force sensing element coupled to the fabric and to the control circuitry, the force sensing element comprising a resistive sensing system and a fluidic sensing system.

In accordance with a still further aspect of the concepts described herein, a wearable article comprises a knitted fabric formed in the shape of a glove, a force sensing element coupled to the fabric, the force sensing element comprising a resistive sensing system; and a fluidic sensing system comprising one or more soft tubes coupled to a surface of the wearable glove wherein the resistive and fluid sensing systems correspond to first and second different sensor modalities which are physically decoupled; and control circuitry attached to the knitted fabric and coupled to receive signals from both the resistive sensing system and the fluidic sensing system and configured to combine resistive and fluidic sensing system signals provided thereto to perform at least one of: pose estimation, environment sensing, human state sensing, and static and dynamic task identification.

In embodiments, the fluidic sensing system comprises at least one pressure transducer and a first end of the soft tubes of the fluidic sensing system are coupled to the at least one pressure transducers and a second end of the tubes are sealed.

In embodiments, the knitted glove is a conductive knitted glove; and the tubes are flexible soft tubes sewn directly into a surface of the glove.

In embodiments, the resistive sensing system further comprises probe points arranged along a surface of the glove and the resistive sensing system is configured to measure spatially varying resistance of the conductive knitted glove as it deforms, allowing postural information to be inferred.

In embodiments, the resistive sensing system multiplexes a measured voltage difference across all pairs of the probe points.

In embodiments, the wearable article comprises a fiber-based material comprising a resistive knit architecture with interwoven pressure sensors.

In embodiments, the flexible soft tubes are sewn directly into an external surface of the glove.

In embodiments, the flexible soft tubes are sewn directly into an internal surface of the glove.

In accordance with a still further aspect of the concepts described herein, a wearable glove comprising a combination of a plurality of sensing systems with at least some of the sensing systems utilizing different sensing modalities which allow pressure and pose to be decoupled.

In embodiments, by combining outputs from at least some of the plurality of sensing modalities, the wearable glove is configured to reason jointly about a plurality of signals provided by the at least some of the plurality of sensing modalities.

In embodiments, the wearable glove is configured to reason jointly using a machine learning approach.

In embodiments, the plurality of sensing systems are a combination of two sensor modalities which are physically decoupled.

In embodiments, the two sensor modalities are jointly reasoned about in a neural machine learning architecture.

In embodiments, the wearable glove is configured to perform at least one of: pose estimation, environment sensing, human state sensing, and static and dynamic task identification.

A wearable glove includes a resistive sensing system comprising one or more a conductive sensors, a fluidic sensing system comprising one or more a fluidic sensors and a controller coupled to receive signals from both the resistive sensing system and the fluidic sensing system and configured to combine resistive and fluidic sensing system signals provided thereto to perform at least one of: pose estimation, environment sensing, human state sensing, and static and dynamic task identification.

The and one or more fluidic sensors are physically decoupled from the one or more a conductive sensors. Since resistive and fluidic sensors are decoupled in input sensitivity, they do not interfere with each other. Thus, the two decoupled sensing systems can serve as building-blocks for pose and pressure sensing, respectively.

In embodiments, the fluidic sensing system comprises means for measuring changes in fluid pressure.

In embodiments, the wearable glove comprises a neural network and/or machine learning system configured to receive signals from the conductive sensors and/or the fluidic sensors. In embodiments, the wearable glove is configured to perform proprioception, identify a number of different stimuli and perform task classification.

A wearable glove with the performance capabilities enabled through the concepts, systems and techniques described herein finds use in a wide variety of applications, including but not limited to: healthcare and health monitoring applications, physical rehabilitation applications, monitoring of rehabilitation efforts and rates (e.g. by providing feedback as to grip strength, as an indicator of stroke recovery), monitoring potential health indicators (e.g. monitoring one or more of heart-rate, muscle tremors or muscle activity as potential health indicators), biomimetic applications, prosthetic applications, real-time hand pose reconstruction, environment sensing, task classification, object classification, robotics interaction (e.g. soft robotics interaction), haptic devices, mixed reality interface applications, intelligent system applications, industrial manufacturing applications, advanced sensing tasks amenable to real-world interaction, including proprioception (i.e. inference of a wearer's hand pose), temperature sensing applications, conductive sensing applications, stiffness sensing, force sensing, inference of dynamic tasks, identification of complex environmentally dependent tasks, held object identification and handwriting recognition. It is noted that all the aforementioned applications may be performed with highly robust accuracy and real-time performance using the wearable glove concepts, systems and techniques described herein.

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which:

FIG. 1A is a top view of a back of a glove comprising both resistive sensing and fluidic sensing systems;

FIG. 1B is a top view of a front (or palm) of the glove of FIG. 1A;

DETAILED DESCRIPTION

Figures 2A, 2B:
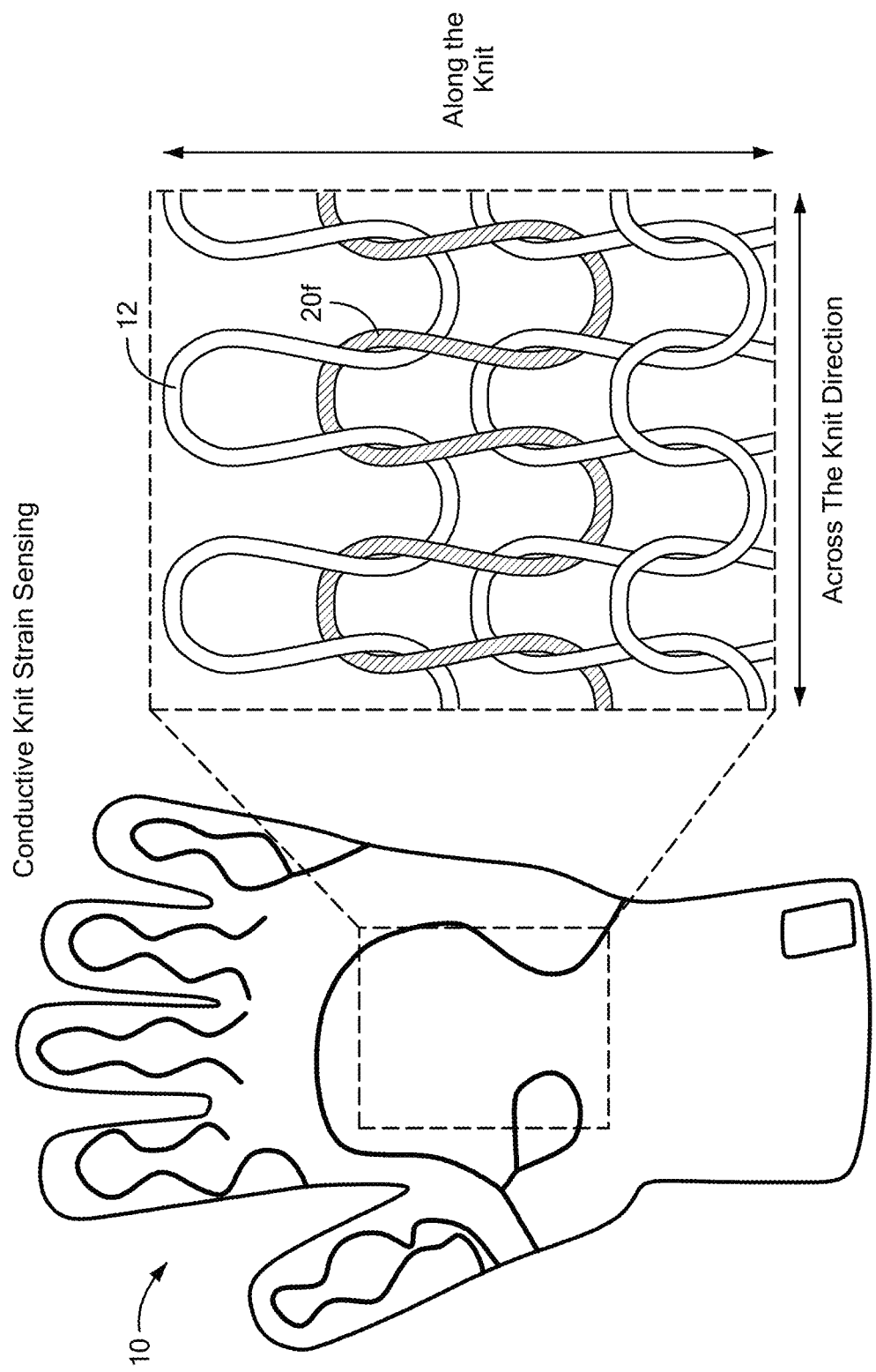
FIG. 2A is a top view of a front (or palm) of the glove of FIG. 1A.
FIG. 2B is an enlarged view of a portion of the glove of FIG. 2A.

In contrast with prior art techniques, the glove described herein utilizes two sensing modalities (resistive and fluidic sensing systems) to achieve a rich, multi-modal stimulus identification system which achieves an accuracy higher than the accuracy of prior art glove approaches. Furthermore, the glove described herein also considers environmental interaction and is capable of performing a number of classifications and/or regressions including but not limited to Hand pose, object recognition, conductibility, grasping force, material stiffness classification, temperature, heart rate, handwriting identification, and the like.

As used herein the term "electronics" refers to any electrical or processing devices other than the conductors, electrodes and tubes which are embedded in or otherwise coupled to the glove fabric. Thus, the term electronics refers, for example, to transducers, multiplexers, controllers which in some embodiments, may not be directly coupled to the glove or glove fabric. It should, of course, be appreciated that in some embodiments some or all electronics may be integrated into the glove (e.g. as part of the fabric from which the glove is provided).

Referring now to FIGS. 1A, 1B, in which like elements are provided having like reference designations, a wearable glove 10 comprises a resistive fabric 12 woven or knit into the shape of a glove. The resistive fabric is formed into a sensing system configured to measure spatially varying resistance of the glove as it deforms, thereby allowing postural information to be inferred. Also coupled to the fabric is a fluidic sensing system 20. Thus, the glove comprises two disparate sensing systems—a resistive sensing system 13 and a fluidic sensing system 20.

The resistive sensing system 13 comprises a plurality of contact points 14 (also referred to as probe points 14) arranged along a surface of the glove. In embodiments, the probe points are conductive pads integrated into the glove's conductive fabric. In this example embodiment, the contact points are disposed in fingers S1-S5 as well as on the back of hand region 15. In certain instances, the contact points are placed in regions of the glove where the hand will not bend, such as between knuckles of the fingers. Additionally or alternatively, the contact points 14 may be placed in locations that provide comfort (or at least to not create discomfort) for a user of the glove.

The contact points 14 are coupled to internal routing conductors 16 (electrical signal paths) which couple the contact points to a controller 18. In some embodiments, the controller may be mounted on a portion of the glove. In some embodiments, the controller may be mounted on the user's wrist rather than on the glove itself. The layout of the contact points 14 is on the top surface or back of the glove (i.e. the surface opposite the palm).

The fluidic sensing system 20 comprises a plurality of tubes, here six (6) tubes 20a-20f disposed on a surface of the glove opposite the sensors 14. However, in various embodiments, the tubes can be placed on the front or back of the glove and the probe points 14 can be placed on the opposite side of the glove. Additionally or alternatively, some of the contact points can be placed on the front of the glove and some on the back of the glove, and/or some of the tubes can be placed on the front of the glove and some on the back of the glove. In the example embodiment of FIG. 1B, the tubes are provided having a circular cross-sectional shape. In other embodiments, the tubes may be provided having elliptical, square or rectangular cross-sectional shapes. Tubes having other cross-sectional shapes may also be used.

Regardless of whether one or multiple tubes are used in different regions of the glove (e.g., multiple tubes in finger regions and/or palm regions of the glove), in embodiments, it may be desirable or even necessary to shape (or configure or arrange or layout) one or multiple tubes in a space-filling shape so that the tubes make as much contact as possible with an object being grasped or otherwise touched by the glove, for example. On the other hand, a trade-off must be made between tube layout and the ability of the glove to allow a hand to deform.

The fluidic sensing comprises flexible soft tubes integrated into a surface of the glove. In embodiments, the flexible soft tubes may be sewn or otherwise coupled directly onto a surface of the glove. In embodiments, the flexible soft tubes may be woven or knit into a fabric of the glove. These tubes are attached to pressure transducers on one end, with the other end sealed. By measuring changes in pressure within the tube, forces applied to the tubes (and thus, force applied to the glove) can be detected.

In embodiments, a fully conductive thread glove may be used as a substrate for the resistive sensing and tube-based sensors for fluidic pressure sensing. Electrodes are placed in strategic locations to maximize deformation information provided by resistance measurements. The resistance between all unique pairs of probe points 14 (or a subset of probe points 14) may be measured to allow large area measurements of strain information.

The tubes may be filled with air or any gas. The tube-based fluidic sensors provide pressure signals induced by compression, as per the ideal gas law. The fluidic tube is a long strand and may have similar strength and dimensions to a piece of yarn. This allows it to be strategically sewn into the glove in a manner to optimize the response to a normal force (e.g. a force that is normal to the glove's surface). The signals from the resistive and fluidic pressure sensing are read synchronously, and the data is fed into a machine learning model for task-based inference.

As will be described below, by applying machine learning techniques, the glove can be used to perform proprioception, identify a number of different stimuli, and also perform task classification. The resistive sensing measures the spatially varying resistance of a conductive knitted glove as it deforms, allowing postural information to be inferred. This is achieved by multiplexing or otherwise detecting measured voltage difference across all pairs of strategically chosen probe points along the glove surface. In other words, a resistance measurement can be made between any two probe points 14 of the glove. As noted above, by measuring changes in pressure within the tube, forces applied to the tubes (and thus, force applied to the glove) can be identified and via a machine learning system. Further, the resistive sensing architecture (i.e. fully conductive glove with integrated probe points) described herein is simple to fabricate and amenable to a wide range of data-driven sensing tasks.

Since glove 10 relies primarily on knitting and sewing technologies, it can be rapidly (machine) manufactured. Further, in embodiments, the glove uses only existing, commercial-off-the-shelf (COTS) materials.

In comparison to prior art wearable systems, the dual-sensing modalities offered by glove 10 allows pressure and pose to be decoupled. This allows for a wide range of different sensory stimuli to be identified. The two sensing modalities in combination with a machine learning system (described below) allow for combined pose and pressure-based identification, and allow for proprioception as well as an accuracy which is higher than accuracy (e.g. higher accuracy of the average joint angle) of prior art devices which perform environment sensing tasks.

Separate systems for measuring resistance and pressure, and the positioning on the glove of the resistive probe points and fluid tubes allow provide resistance and pressure readings that do not interfere with each other. Since the resistive and fluidic measurements are substantially independent, a downstream processor that implements a machine learning algorithm can translate the measurements to identification of a glove state such as hand pose classification, grasped object classification, and the like.

In embodiments, due to the inclusion of the conductors within the knit, the glove may have an electrical resistance of approximately 5 $\Omega cm^{-1}$ which varies when a mechanical resistance or force is applied. Due to the knit pattern, the material may undergo approximately 70% strain and when relaxed, the knit returns to a similar state. The knit pattern may be directional, and thus the sensitivity and sensing capabilities of the knit may also be directional.

Although in the example embodiment of FIG. 1B only one tube is disposed on each finger and in the palm region of the glove, in some embodiments, it may be desirable or even necessary to use multiple tubes in one or more finger regions of the glove and/or in the palm region of the glove.

Referring to FIGS. 2A and 2B, a breakout or enlarged portion of the resistive fibers 12 and fluidic sensors 20f of the glove 10 is shown. The fibers and fluidic sensors may be arranged so that they follow a serpentine path across the knit, having loops extended along the knit (i.e. loops in the up and down direction in FIGS. 2A and 2B. In embodiments, it may be desirable for the knit to have high sensitivity to strain along and low sensitivity to strain across the knit so that the majority of deformations of the hand (particularly in the DIP and PIP joints of the fingers) bend in the direction along the knit. In such an arrangement, the along the knit may have high repeatability but also a very high hysteresis. In other words, a pulling force along the knit may cause the loops of the sensors to strain against each other, which may cause weaker connections (i.e. change the resistance between locations and/or probe points 14 of the glove). In contrast, a pulling force in a direction perpendicular to the knit may cause a different (e.g. lesser) response in the resistance due to the direction of the of the loop structure of the knit.

The average response time may be on the order of about 0.35 seconds, and for 80 cycles may be approximately 0.8 seconds. This may potentially limit the use of the knitted glove as a sensor for some application which require a fast response, such as slip detection, but was not a major inhibiting concern for any of the applications describe herein.

The knitted fabric of the glove provides at least three further benefits. First, it is fiber-based, making it easy to attach additional sewable components, such as fluidic tubes or conductive fibers for coupling to wrist-mounted electronics (e.g. controller 18 in FIG. 1A). This latter connection helps keep electronics off the hand itself, avoiding the need for flexible electronics and promoting ergonomic use. Second, the knit structure of the glove has minimal strain-based response to normal force/pressure. This ensures that the (pressure) responses of our fluidic tubes are maximally decoupled from the response of the knit. Third, because the glove is fully conductive, hand self-collision (including fingertip-fingertip or fingertip-palm contact, as seen in an "OK" or "thumbs-up" gesture respectively) emits a noticeable signal, making it easy to computationally detect these types of gestures.

The fluidic tube may operate in accordance with the ideal gas law: $PV=nRT$.

Compression of the fluidic tube caused by contact results in an inversely correlated response in internal pressure. Furthermore, the fluidic sensors' correlation to temperature allows the wearable glove 10 to detect changes in held objects' temperatures (given a constant holding force). The fluidic sensors complement the sensing of the knit matrix, providing out-of-plane deformation information typically caused by environmental interaction. In embodiments, the fluidic sensors comprise one or more soft flexible tubes, sealed at one end and connected to a pressure transducer with an airtight seal at the other end. Although any airtight tubes or bladders could be used, a thin, soft tube allows for easy integration into the glove. Preferably, the tubes are soft enough to be sewn onto the glove fabric, and thin and deformable enough to respond to hand movements (e.g. hand positions or touching an object). Thus, the fluidic sensors may be sensitive to normal force and shows a linear and repeatable response with minimal hysteresis.

Figure 3:
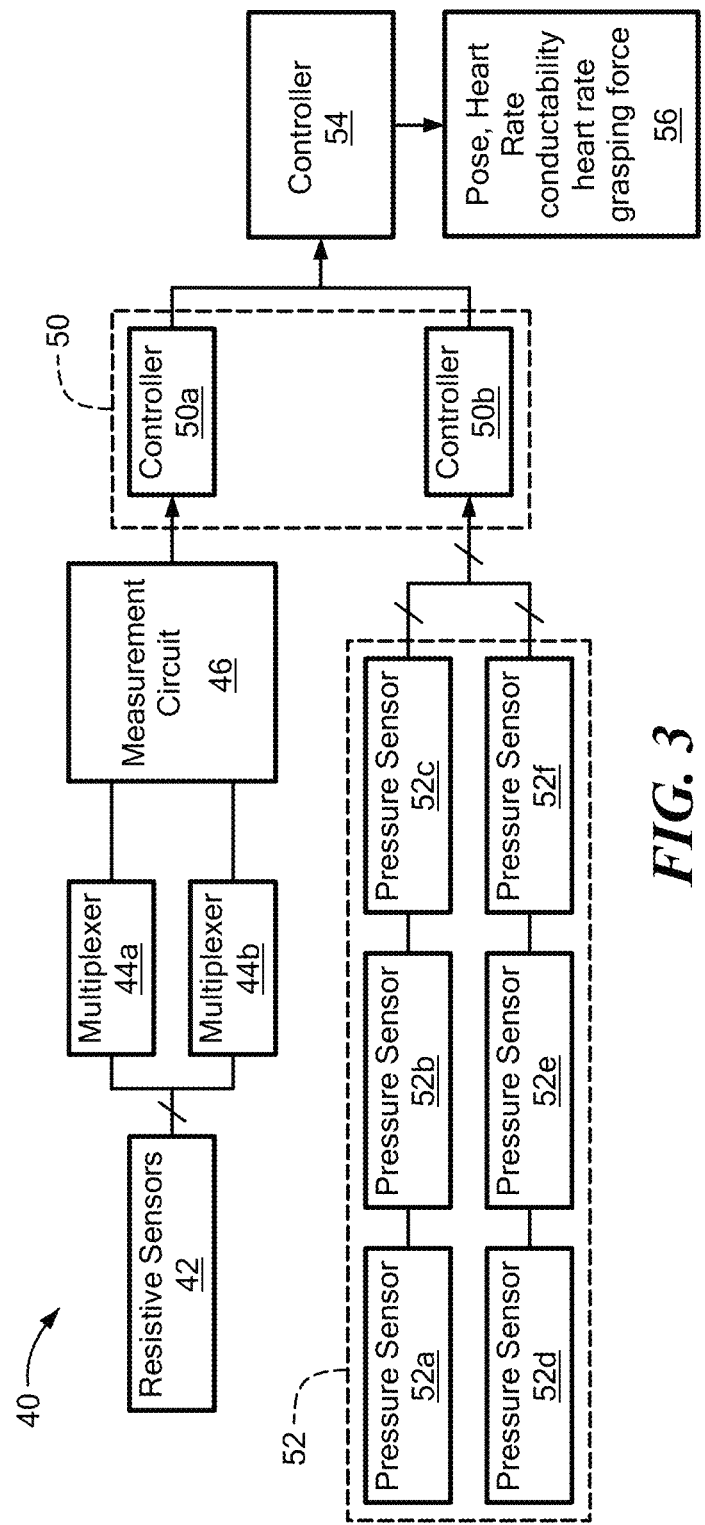
FIG. 3 is a block diagram of a system architecture of a glove having both resistive sensing and fluidic sensing systems.

Referring now to FIG. 3, a sensing system 40 suitable for use in a wearable sensor glove such as sensor glove 10 described above in conjunction with FIGS. 1A-2B, includes a resistive sensing system 42 comprising one or more resistive sensing elements and a fluid sensing system 52 comprising one or more pressure sensors, with here six (6) pressure sensors 52a-52e being shown. The resistive sensing system 42 and fluid sensing system 52 may be disposed on and/or integrated with a fabric substrate such as the fabric substrate in the shape of a glove described above at least in conjunction with FIGS. 1A-2A.

In particular, one or more resistive sensors (e.g. strands of conductive material) and/or tubes may be integrated into the glove fabric. In embodiments, the fabric of the glove may be conductive and the resistive sensors 42 may comprise a plurality of probe points (illustrated as electrodes 14 in FIG. 1B) disposed on or integrated into the glove at various locations on the fabric. Resistance or other electrical characteristics can be measured at or between any two probe points (e.g. any two of electrodes 14 described above in conjunction with FIG. 1A). As the glove moves and changes position, the resistance of sensors 42 (i.e. the resistance between any two probe points) may change in response to movement of the glove or change in pose of the glove. Additionally, if the glove picks up an object, resistance (or other measurable electrical characteristic) between two probe points of the glove may change based on the conductivity of the object. For example, if a metal object is picked up by the thumb and first finger of the glove, it may create a short circuit (or very low resistance circuit) between probe points on the thumb and first finger.

To measure resistance (or other electrical characteristic) between different probe points, the glove may have one or more multiplexers 44a-44b disposed to selectively couple signals from at least first and second different ones of the probe points (e.g. electrodes 14). Thus, multiplexer 44a couples a first electrical characteristic from a first probe point (e.g. from a first one of the electrodes 14 in FIG. 1) to an output of the multiplexer 44a. Similarly, multiplexer 44b couples a first electrical characteristic from a second, different probe point (e.g. from a second, different one of the electrodes 14 in FIG. 1) to an output of the multiplexer 44b.

The outputs of the multiplexers are provided to a measurement circuit 46, which measures electrical characteristics between the multiplexed probe points. In embodiments, the measurement circuit may measure resistance by, for example, driving a known current through the probe points and measuring the voltage across the probe points.

The measurement circuit 46 may be configured to measure other electrical characteristics across the glove's probe points (i.e. electrical characteristics across the glove's probe points other than resistance) including, but not limited to:

voltage, current, capacitance, impedance, inductance, and the like. These measurement may be useful in detecting an object held by the glove, a position of the glove, an activity being performed by the glove, etc.

In embodiments in which the first electrical characteristic corresponds to a resistance characteristic (e.g. a resistance value) at the first and second probe points, the measurement circuit 46 may comprise a bridge circuit (e.g. a Wheatstone bridge). In response to the two resistance values provided thereto from multiplexers 44a, 44b (or in response to a difference in resistance characteristics provided thereto from multiplexers 44a, 44b) the bridge circuit generates an output signal which is provided to controller 50a.

In the example of FIG. 1A, the glove is provided having sixteen (16) probe points 14a-14p with three probe points (14a-14c; 14d-14f; 14g-14i; 14j-14l) on respective ones of finger S4-S1, two probe points (14m, 14n) disposed on the thumb S5 and two probe points (14o, 14p) disposed on the palm region S6. Thus, multiplexers 44a, 44b are configured to receive signals from each of the probe points. With 16 probe points, the multiplexers may provide 256 different combinations of measurements.

It should be noted that although the example glove of FIG. 1A sixteen (16) probe points are used, in other embodiments, fewer or more than sixteen probe points may be used. The number of probe points to use in a particular application may be selected to suits the needs of the application.

System 40 also includes one or more pressure sensors 50. The pressure sensors 50 may be integrated into the glove fabric (e.g. as in woven or knitted as part of the glove fabric) or may be disposed on a surface of the fabric (e.g. attached via sewing or other coupling technique. As noted above, in this example embodiment, the glove includes six (6) pressure sensors 52a-52e. The pressure sensors may be tubes filled with a fluid (e.g. air or a gas) that changes pressure as the glove moves and the tube deforms. An electronic pressure sensor detects the pressure within the tube and provides a pressure signal that represents the pressure.

The glove may also include a controller bank 50 having one or more controller circuits 50a, 50b. In the example shown, controller 50a is coupled to receive and/or measure the resistance from the resistive sensors 42 and controller 50b is coupled to receive and/or measure the pressure from the pressure sensors 52.

A system controller circuit 54 may be coupled to receive the resistance and pressure measurements from controller circuits 50a, 50b. The controller circuit 54 may implement an algorithm that detects the state of the glove (i.e. a pose, position, pressure, activity, or other state) based on the resistance and pressure measurements, and provides the detected state as an output 56. In embodiments, the controller circuit 54 implements a neural network that is trained to detect the glove's state based on the resistance and pressure measurements (or data) from the sensors. A neural network implementation for detecting the glove's state will be discussed below.

In embodiments, the system 40 includes multiple controller circuits 50a, 50b, 54 as shown. In other embodiments, more controller circuits or fewer controller circuits may be included. For example, a single controller circuit may be used to perform all the functions of circuits 50a, 50b, and 54. Alternatively, the functions of controller circuits 50a, 50b, and 54 may be split among four or more controllers.

The controller circuits 50a, 50b, and 54 may be generic processors, microprocessors, programmable hardware circuits, custom circuits, or any kind of circuit that can perform the functions described herein.

To detect a motion-based activity performed by the glove, such as handwriting or sign language, the controller circuits 50a, 50b, and or 54 may detect and store a time series of pressure and resistance measurements from the glove's sensors. The sequence of changes in the resistance and pressure readings can be used by the processors to detect the type of activity.

Figure 4A:
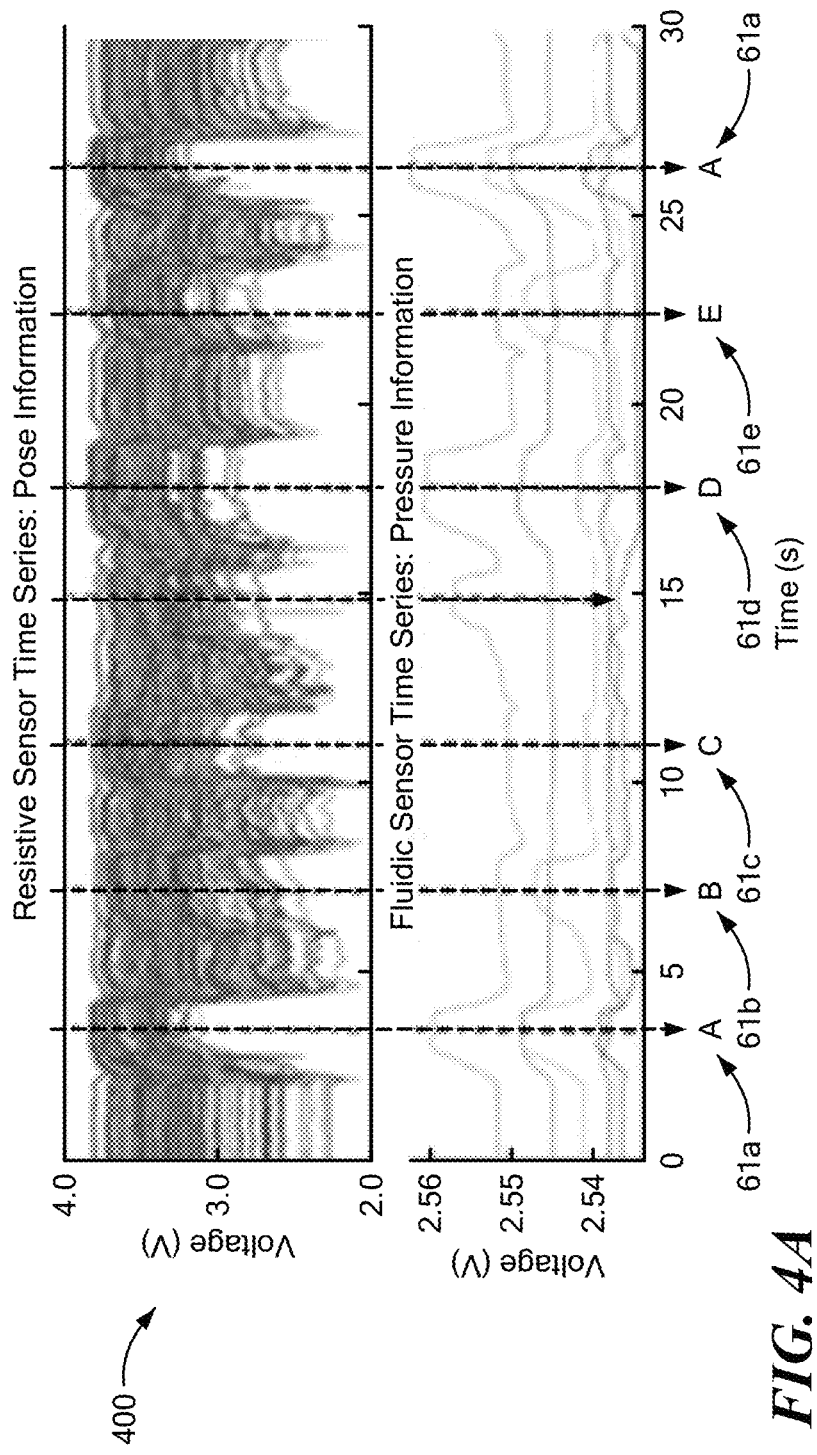
FIG. 4A is a plot of unprocessed (or "raw") exemplar time series data from both the resistive and fluidic sensors for a variety of different hand poses.
Figure 4B:
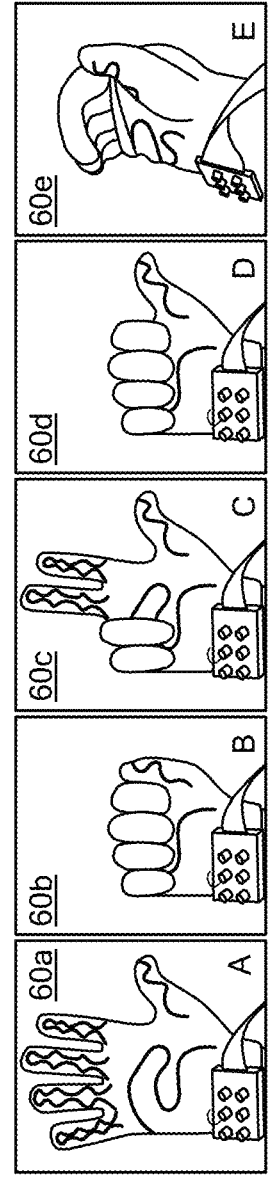
FIG. 4B is a graphical illustration of example glove poses corresponding to the time series data of the plot of FIG. 4A.

Referring to FIGS. 4A and 4B, plot 400 provides an example of unprocessed (or "raw") exemplar time series data from both the resistive and fluidic sensors for a variety of different hand poses 60a-60e. For each pose, the plot 400 shows a different pressure and resistance profile. As the glove changes position to different poses, the pressure and resistance measured from the glove's sensors changes. The controller circuits 50a (FIG. 3), 50b (FIG. 3), and 54 (FIG. 3) may record the values of the sensor outputs to detect the gloves pose. Additionally, or alternatively, the controller circuits may record the time-sequence of changes in the sensor outputs, which can be used by the controller circuits to detect an activity of the glove.

In FIG. 4A, the resistance and pressure measurements (represented as voltages) for distinct hand poses are shown. For example, hand position 60a (shown in FIG. 4B) results in the resistive and fluidic measurements (or data points, which in this example are voltages) at point 61a, hand position 60b results in resistive and fluidic measurements at point 61b and so on and so forth.

Figure 5:
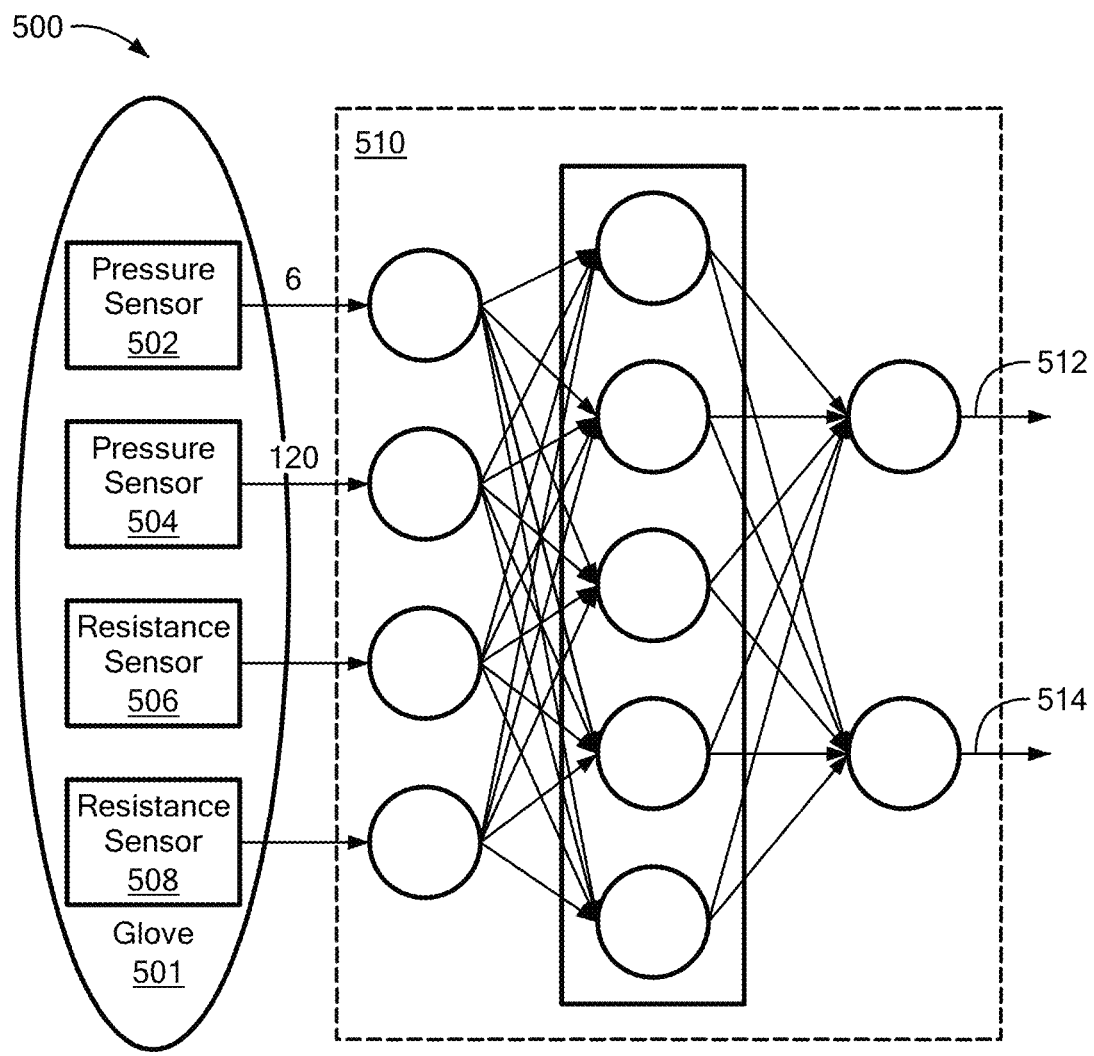
FIG. 5 is block diagram of a wearable glove system having both resistive sensing and fluidic sensing systems coupled to a system implementing a machine learning algorithm.

FIG. 5 is a block diagram of a system 500 for detecting and identifying the state of the glove 500. Sensors of the glove 501 (e.g. tube pressure sensors 502, 504 and resistance sensors 506, 508) are coupled to inputs of a neural network 510. The neural network receives signals from the sensors 502-508 that indicate the current pressure of the tube sensors and/or the resistance of the resistance sensors that are embedded in the glove 501. For ease of illustration, the glove 501 is shown having two pressure sensor outputs and two resistance sensor outputs. However, the glove 501 may have any possible or practical number of sensors and associated sensor outputs. In some embodiments, glove 501 may have six tube pressure sensors and one-hundred twenty multiplexed resistance sensors, the outputs of which are provided as inputs to the neural network 510.

The neural network 510 may include an input layer to receive the signals from the sensors, an output layer that provides one or more output signals 512, 514 indicating the output decisions of the neural network 510, and one or more hidden layers to process the input signals and produce the output signals. The neural network 510 shown in FIG. 5 is a multilayer perceptron ("MLP") neural network. However, neural network 510 is not limited to MLP neural networks. In other embodiments, neural network 510 may be implemented as a hidden Markhov model ("HMM") neural network, a perceptron neural network, a modular neural network, a convolutional neural network, a long short-term memory ("LSTM") neural network, or any other neural network suitable for and trainable to receive glove sensor signals and generate outputs 512, 514.

The output signals 512, 514 may be signals that indicate a detected state of the user, a detected state of the environment, and/or a detected task being performed. The states can include, but are not limited to, a pose or position of the glove 501, a heart rate of a user who is wearing the glove, as detected by the glove 501, a force applied to the glove or by a hand or servo within the glove, a stiffness of the glove, a temperature of the glove or of an object held by the glove, the identification of an object being held by the glove, or an activity being performed by the glove such as handwriting, waving, or sign language.

In the embodiment shown in FIG. 5, a single neural network is coupled to receive signals from the glove 501. In other embodiments, multiple neural networks may be used. In this case, a subset of the sensor outputs may be coupled to one or more of the neural networks. Additionally, or alternatively, all the sensor outputs may be coupled to one or more of the neural networks. In the case where multiple neural networks are used, each neural network may be trained to identify a different state. For example, one neural network may be trained to identify hand poses, while another may be trained to identify the task of handwriting or sign language. In the case where a single neural network is used, the neural network may be trained to detect one, some, or all of the glove states mentioned above.

Figure 6:
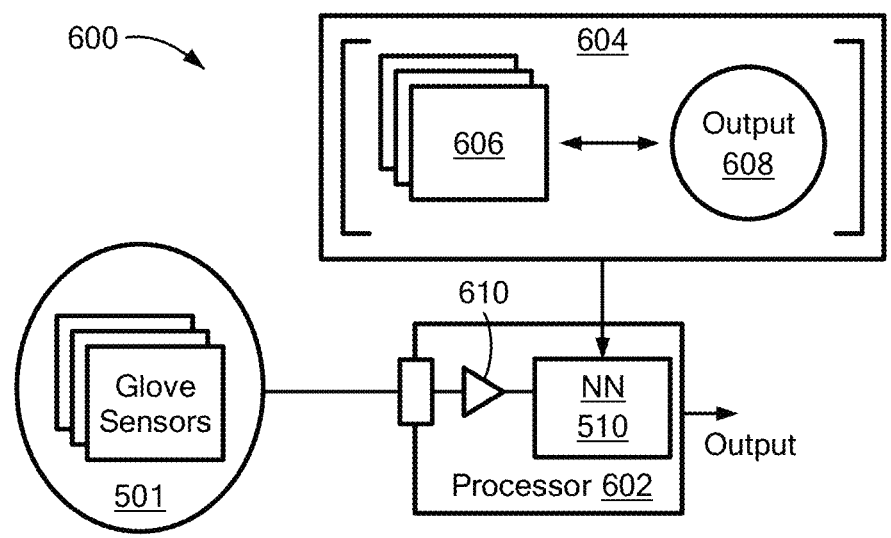
FIG. 6 is block diagram of a wearable glove system having both resistive sensing and fluidic sensing systems coupled to a system implementing a neural network trained with training data.

Referring to FIG. 6, a block diagram for a system 600 for detecting the state of glove 501 includes a processor 602 that implements the neural network 510. The processor 602 may be any sort of processor such as a general-purpose processor, an FPGA, a microprocessor, or the like. Processor 602 may be coupled to or include a memory (e.g. a ROM or RAM) and/or a non-volatile storage device (e.g. a disk drive or FLASH drive). The memory may include software instructions that cause the processor perform functions that implement the neural network 510.

A training data set 604 may be used to train the neural network 510 so that it can identify the state of the glove 501. The training set 604 may include sets of paired inputs (e.g. inputs 606) and outputs (e.g. output 608). The inputs represent values of the sensor signals and the output represents the glove state associated with the paired set of sensor values. For example, a set of glove sensor signal values may indicate that the glove is in a particular pose. Thus, the training data set 604 may include a input-output pair where the input is the set of glove sensor signal values associated with the pose, and the output is the pose.

The training data set 604 can include various types of outputs associated with the sensor inputs. These include, but are not limited to, glove poses, positions, and orientations; metrics about a user including pulse rate, blood pressure, body temperature, activity level; information about the glove's environment such as a force applied to or by the glove, a stiffness of the glove, a temperature of the glove or the environment or an object held by the glove; or tasks such as holding an object or handwriting.

In some instances, the system 600 may detect motion of the glove instead of or in addition to detecting a static state of the glove. This can be useful for detecting activities that require motion, such as handwriting. For example, during handwriting, the glove 501 will move. As the glove moves, the outputs of the sensors will vary and change over time. The sequence and values of these variations may follow a particular pattern that indicates that the glove is performing the task of handwriting. In embodiments, the neural network 510 can be trained to identify the sequence of sensor output variations as handwriting (or as other tasks, as appropriate).

To accomplish this, system 600 may include circuitry 610 that detects variations in sensor output values over time instead of, or in addition to, detecting the sensor values themselves. These variations of the sensor outputs may be provided as inputs to the neural network 510 so that when the variations match a particular motion-oriented task, the neural network 510 can identify the task. Also, the training data 604 may include one or more input-output pairs wherein the inputs 606 represent the sequence and variation of changes in the sensor output associated with a particular task, and the output 608 identifies the task.

Various embodiments of the concepts, systems, devices, structures, and techniques sought to be protected are described above with reference to the related drawings. Alternative embodiments can be devised without departing from the scope of the concepts, systems, devices, structures, and techniques described. It is noted that various connections and positional relationships (e.g., over, below, adjacent, etc.) may be used to describe elements in the description and drawing. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

As an example of an indirect positional relationship, positioning element "A" over element "B" can include situations in which one or more intermediate elements (e.g., element "C") is between elements "A" and elements "B" if the relevant characteristics and functionalities of elements "A" and "B" are not substantially changed by the intermediate element(s).

Also, the following definitions and abbreviations are to be used for the interpretation of the claims and the specification. The terms "comprise," "comprises," "comprising, "include," "includes," "including," "has," "having," "contains" or "containing," or any other variation are intended to cover a non-exclusive inclusion. For example, an apparatus, a method, a composition, a mixture or an article, that comprises a list of elements is not necessarily limited to only those elements but can include other elements not expressly listed or inherent to such apparatus, method, composition, mixture, or article.

Additionally, the term "exemplary" is means "serving as an example, instance, or illustration. Any embodiment or design described as "exemplary" is not necessarily to be construed as preferred or advantageous over other embodiments or designs. The terms "one or more" and "at least one" indicate any integer number greater than or equal to one, i.e. one, two, three, four, etc. The term "plurality" indicates any integer number greater than one. The term "connection" can include an indirect "connection" and a direct "connection".

References in the specification to "embodiments," "one embodiment," "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether or not explicitly described.

Relative or positional terms including, but not limited to, the terms "upper," "lower," "right," "left," "vertical," "horizontal, "top," "bottom," and derivatives of those terms relate to the described structures and methods as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another, or a temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

The disclosed subject matter is not limited in its application to the details of construction and to the arrangements of the components set forth in the following description or illustrated in the drawings. The disclosed subject matter is capable of other embodiments and of being practiced and carried out in various ways.

Also, the phraseology and terminology used in this patent are for the purpose of description and should not be regarded as limiting. As such, the conception upon which this disclosure is based may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, the present disclosure has been made only by way of example. Thus, numerous changes in the details of implementation of the disclosed subject matter may be made without departing from the spirit and scope of the disclosed subject matter.

Accordingly, the scope of this patent should not be limited to the described implementations but rather should be limited only by the spirit and scope of the following claims.

All publications and references cited in this patent are expressly incorporated by reference in their entirety.

The invention claimed is:

1. A wearable article comprising:
   a knitted fabric formed in a shape of a wearable glove;
   a force sensing element coupled to the knitted fabric, the force sensing element comprising:
   a resistive sensing system; and
   a fluidic sensing system comprising one or more soft tubes coupled to a surface of the wearable glove wherein the resistive and fluidic sensing systems correspond to first and second different sensor modalities which are physically decoupled; and
   a control circuit attached to the knitted fabric and coupled to receive signals from both the resistive sensing system and the fluidic sensing system and configured to combine resistive and fluidic sensing system signals provided thereto to detect a pose and/or position of the wearable article.

2. The wearable article of claim 1 wherein at least one of the one or more soft tubes comprises:
   a first end;
   an opposite, sealed end; and
   a pressure transducer coupled to the first end.

3. The wearable article of claim 2 wherein:
   the knitted fabric is formed as a conductive, knitted glove; and
   the one or more soft tubes are flexible soft tubes sewn directly into a surface of the knitted fabric.

4. The wearable article of claim 3 wherein the resistive sensing system further comprises sensor probe points arranged along a surface of the conductive, knitted glove and the resistive sensing system is configured to measure spatially varying resistance of the conductive, knitted glove as it deforms, allowing postural information to be inferred.

5. The wearable article of claim 4 wherein the resistive sensing system multiplexes a measured voltage difference across all pairs of the sensor probe points.

6. The wearable article of claim 3 wherein the conductive, knitted glove comprises a fiber-based material comprising a resistive material arranged in a knit architecture with pressure sensors interwoven among interlocking loops of the fiber-based material.

7. The wearable article of claim 3 wherein the flexible, soft tubes are sewn directly into an external surface of the knitted fabric.

8. The wearable article of claim 3 wherein the flexible soft tubes are sewn directly into an internal surface of the knitted fabric.

9. The wearable article of claim 1 wherein;
   the soft tubes are configured to flex in response to a change in position of the wearable article;
   the change in position causes a change in internal pressure of the soft tubes; and
   the control circuit is configured to use the internal pressure in the soft tubes to calculate an estimation of the pose and/or position of the wearable article.

10. The wearable article of claim 1 wherein:
    the fluidic sensing system is configured to measure a pressure within at least one of the one or more soft tubes;
    the control circuit is configured to implement a machine learning algorithm; and
    the machine learning algorithm is configured to use the measured pressure to estimate at least one of: pose estimation, environment sensing, human state sensing, and static and dynamic task identification.

11. A wearable glove comprising:
    a resistive sensing system comprising one or more resistive sensors; and
    a fluidic sensing system comprising one or more fluidic sensors that are physically decoupled from the one or more resistive sensors, the one or more fluidic sensors configured to provide a pressure measurement in response to a pose or position of the wearable glove; and a control circuit configured to receive the pressure measurement and use the pressure measurement to detect the pose or position of the wearable glove.

12. The wearable glove of claim 11 further comprising a control system configured to receive signals from the one or more resistive sensors and the one or more fluidic sensors.

13. The wearable glove of claim 12 wherein the fluidic sensing system comprises means for measuring changes in fluid pressure.

14. The wearable glove of claim 13 wherein the fluidic sensing system comprises one or more soft tubes coupled to a surface of the wearable glove.

15. The wearable glove of claim 14 wherein at least one of the one or more soft tubes comprises:
a first end;
an opposite, sealed end; and
a pressure transducer coupled at the first end.

16. The wearable glove of claim 14 wherein at least one of the one or more soft tubes of the fluidic sensing system comprises:
a first end;
an opposite, sealed second end;
a pressure transducer coupled to the first end; and
wherein the fluidic sensing system further comprises a control system configured to receive signals from the one or more resistive sensors and the pressure transducer.

17. A wearable glove comprising:
a fabric;
a control circuit;
a force sensing element coupled to the fabric and to the control circuit, the force sensing element comprising:
a resistive sensing system; and
a fluidic sensing system, the fluidic sensing system configured to produce a fluid pressure in response to a position of the wearable glove and generate a pressure signal representing the fluid pressure; and
a control circuit configured to receive the pressure signal and use the pressure signal to detect a pose and/or position of the wearable glove.

18. The wearable glove of claim 17 wherein the fluidic sensing system comprises soft tubes coupled to a surface of the wearable glove.

19. The wearable glove of claim 18 wherein the soft tubes are flexible, soft tubes sewn directly into the surface of the wearable glove.

20. The wearable glove of claim 19 further comprising one or more pressure transducers and wherein a first end of the flexible, soft tubes of the fluidic sensing system are coupled to one or more of the one or more pressure transducers and a second, opposite end of the flexible, soft tubes are sealed.

21. The wearable glove of claim 20 wherein:
the fabric is a conductive, knitted fabric; and
the resistive sensing system is configured to measure spatially varying resistance of the wearable glove as it deforms, allowing postural information to be inferred.

22. The wearable glove of claim 21 wherein the resistive sensing system further comprises probe points arranged along a surface of the wearable glove.

* * * * *